June 11, 1929.  P. N. LANDINE  1,716,858
WINDSHIELD
Filed June 18, 1927   2 Sheets-Sheet 1

INVENTOR.
Peter N. Landine
BY Mitchell & Bechert
ATTORNEYS.

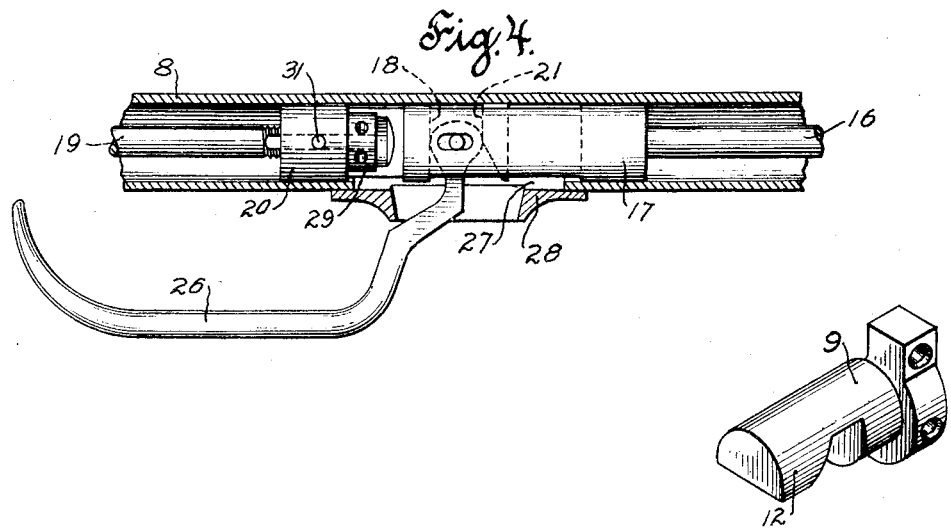
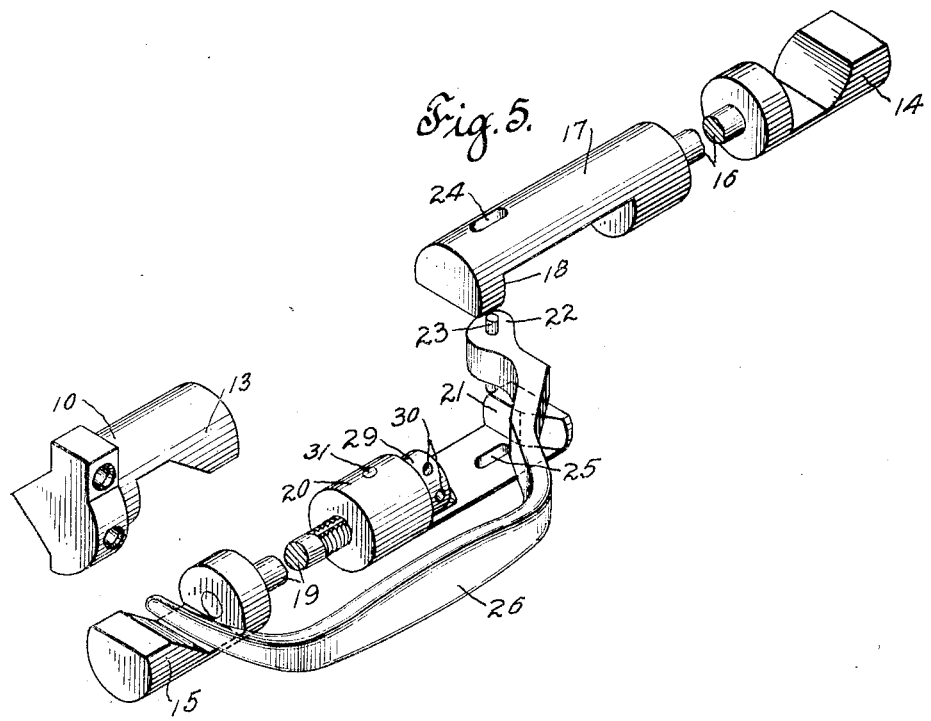

Patented June 11, 1929.

1,716,858

UNITED STATES PATENT OFFICE.

PETER N. LANDINE, OF MILFORD, CONNECTICUT.

WINDSHIELD.

Application filed June 18, 1927. Serial No. 199,723.

My invention relates to a wind shield.

It is the general object of the present invention to provide a secure, relatively simple means for holding a swinging wind shield panel in adjusted position.

It is a further object to provide a wind shield with means for holding the swinging panel in adjusted position, which means may be quickly and readily actuated with one hand from a point intermediate the edges of the wind shield.

It is another object to provide a wind shield with means for both swinging the movable panel and clamping the same in adjusted position.

It is a further object to provide a wind shield with readily adjustable means for holding the wind shield and swinging panel in various positions.

Other objects and features of the invention will appear as the specification proceeds.

Briefly stated, in the preferred form of the invention I provide the swinging panel with a tubular member serving as the swinging support. Wedge means preferably at both ends of the tubular member serve to hold the latter and the swinging panel in various positions of adjustment. The wedge means may be actuated by a handle member positioned at any convenient point intermediate the edges of the wind shield, and the wedging members may be arranged for adjustment so as to compensate for wear. The means for actuating the wedge means may be so arranged as to serve the purpose of a convenient handle for swinging the panel in either direction to thus permit the panel to be swung and clamped with one hand.

In the drawings which show, for illustrative purposes only, a preferred form of the invention—

Fig. 4 is a fragmentary, horizontal sectional view of an intermediate portion of a wind shield;

Fig. 5 is a detail view of operative parts of my invention, the various elements being relatively separated for the purpose of illustration.

Figure 1:
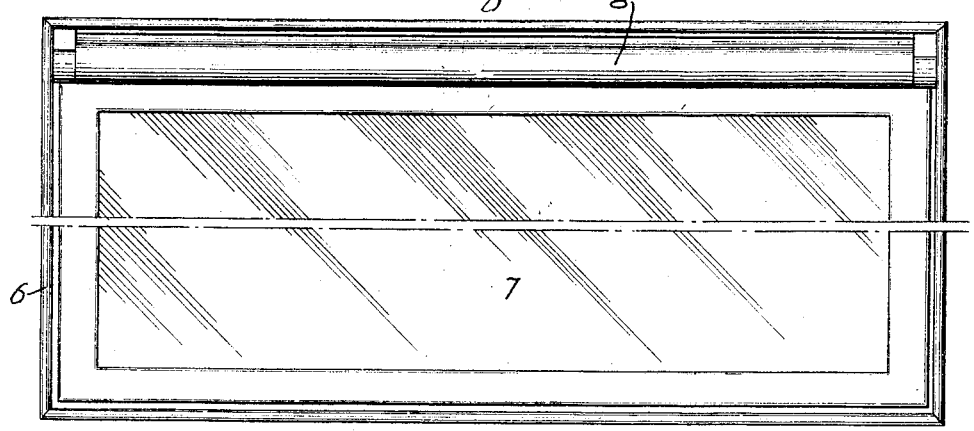
Fig. 1 is a front view of a wind shield.
Figure 2:
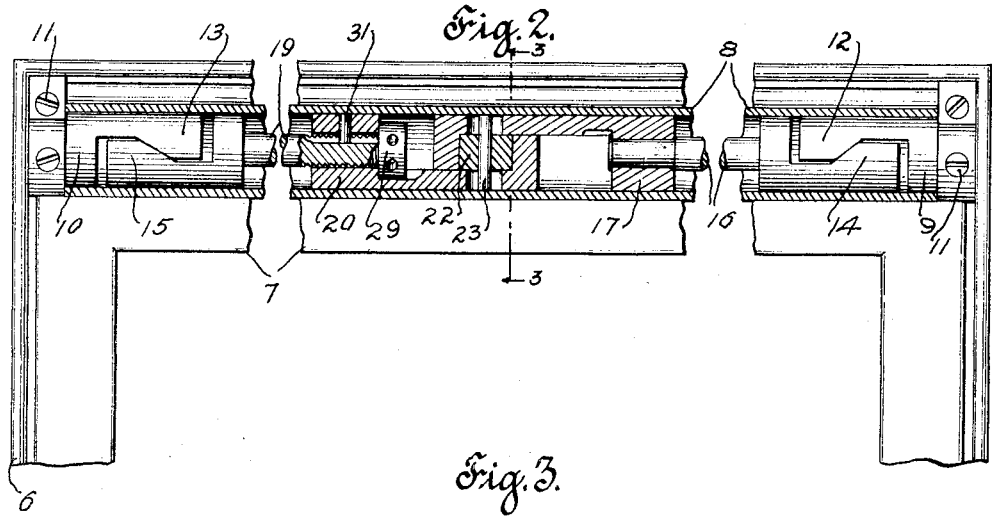
Fig. 2 is a fragmentary, vertical sectional view through the swinging panel of a wind shield, and illustrating features of the invention.
Figure 3:
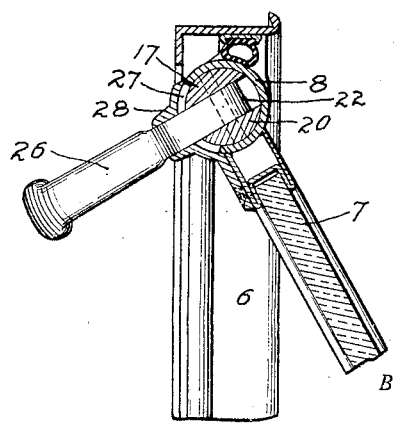
Fig. 3 is a sectional view taken substantially in the plane of the line 3—3 of Fig. 2.

In the particular embodiment illustrated, 6 indicates a frame whch may be positioned in a closed car and may receive the swinging panel 7. While the invention will be described in connection with a wind shield for a closed type of vehicle, it is to be understood that the invention is not confined to closed cars. The swinging panel 7 includes a tubular member 8 preferably extending from side to side of the panel. This tubular member 8 serves as the swinging bearing of the panel, and is journaled at the sides upon bosses 9—10, which may be suitably secured to the edges of the frame 6 as by means of screws 11—11. The bosses 9—10 in the form shown are extended inwardly, and the inner ends 12—13 have inclined wedge faces formed thereon, as shown particularly in Figs. 2 and 5. Complementary movable wedges 14—15 are positioned within the tube 8 and coact with the fixed wedges 12—13 so that when the wedges 14—15 are drawn inwardly toward each other, the wedge members 12—14 and 13—15 will be expanded to grip the inner surface of the tube 8 and thus hold the swinging panel 7 in adjusted position.

It is desirable to have the control means for the wedge mechanism positioned intermediate the edges of the wind shield and to have the wedge mechanism at both ends controlled by a single means. For the accomplishment of that end I may employ a tension rod 16 secured to the wedge 14 and rotatably attached at the inner end to a cam plug 17 having a cam surface or abutment 18 at the left hand side as viewed in Figs. 2, 4 and 5. The movable wedge 15 has rotatably secured thereto a tension rod 19 extending inwardly and provided at the inner end with a cam plug 20 having a cam surface or abutment 21 thereon. In the form shown, the cam plugs 17 and 21 extend inwardly to and beyond each other so that the cam surface on each plug is between the cam surface on the other plug and the wedge movable with said other plug. A cam or eccentric 22 is positioned between the cam surfaces 18—21, and in the form illustrated is journaled upon a pin 23 passing through slots 24—25 in the respective cam plugs. In order to move the eccentric or cam 22, I preferably employ a relatively long arm or handle 26, which is of such size that it may be readily gripped with the hand. The greater diameter of the eccentric preferably extends along the same general line as the line of the handle 26, so that when the handle is positioned at substantially right angles to the tube 8, the cam surfaces 18—21 may approach each other and thus release the wedges. When the handle is moved into substantial parallelism with the tube 8 as shown in Fig. 4, the cam surfaces 18—21 will be separated by the cam 22, and the wedges thus caused to be moved into clamping relation with the tube 8. The tube 8 is suitably slotted at 27 to permit passage of the actuator 26, and if desired a suitable escutcheon plate 28 may be secured to the tube to provide a finished appearance.

In order to compensate for wear on the wedge surfaces and to permit of any necessary adjustment, I provide means for adjustably positioning the wedges relatively to each other. In the form shown, the rod 19 is threaded and is provided with an adjusting nut 29 at its inner end, which nut abuts a suitable surface or shoulder on the cam plug 20. The nut 29 may be provided with recesses 30 for receiving a pin for turning the nut. The rod 19 is preferably keyed as at 31 to the plug 20 so that any rotation of the plug 20 will not tend to loosen or tighten the nut 29.

When in use, the driver or other occupant of the car may, with one hand, grasp the actuator 26, and pull the same rearwardly so as to release the wedging means at the ends of the swinging panel. If a long convenient handle 26 be provided, as shown in Figs. 4 and 5, the handle may be employed for swinging the panel in either the opening or closing direction. When the panel is in the desired position, the operator, still grasping the handle 26, may move the latter forwardly into the position shown in Figs. 4 and 5, and thus cause the swinging panel to be held in the desired position. The actuator 26 may be positioned at any point along the tube 8, but is preferably arranged somewhere near the center so as to be in convenient reach of the operator of the vehicle. Since the handle 26 serves to actuate both the wedging means and may be employed for swinging the wind shield panel, it will be clear that only one hand of a person is necessary for both swinging and locking the swinging panel in the desired position. Since the connection between the plugs 17—20 is what may be termed a floating connection, equal forces will be impressed upon the two movable wedges and the wedging forces at the two ends of the swinging panel thus equalized.

The parts are all of relatively simple and sturdy construction, and the device is not likely to get out of order. Any adjustment found to be necessary may be readily made by turning the nut 30 on the rod 19.

While a preferred form of the invention has been described in great detail, I do not wish to be limited to the particular form shown, since many changes may be made within the scope of the invention as defined in the appended claims.

What I claim is:

1. In a wind shield, a support, a swinging panel including a tubular member, non-rotatable wedge members fixedly held on said support at opposite sides of said tubular member and extending into said tubular member and serving as journals therefor, complementary non-rotatable wedge members also housed within said tubular member and coacting with said first mentioned wedge members, and means swinging with said panel intermediate the ends of said tube for causing expansion and contraction of said wedge members within said tube for the purpose described.

2. In a wind shield, a swinging panel including a tubular member, non-rotatable wedging means within and pivotally supporting said tubular member for holding said panel in adjusted position, and a single lever intermediate the edges of said panel for drawing a part of said wedging means longitudinally of said panel for the purpose described and for swinging said panel.

3. In a wind shield, a swinging panel including a tubular member, non-rotatable wedge members within said member for holding said panel in adjusted position, means for moving one of said wedge members longitudinally relatively to the other, a manual actuator therefor extending through said member, said actuator swinging with said panel, and means for adjusting the connection between said movable wedge and said manual actuator.

4. In a wind shield, a swinging panel, non-rotatable wedge members on which the panel is pivoted for holding said panel in adjusted position, means for longitudinally moving one of said wedge members relatively to the other for causing expansion and contraction of said wedge members, and a unitary lever for adjusting the normal position of one of said wedge members relatively to the other for the purpose described and for swinging said panel.

5. In a wind shield, a support, a swinging panel including a tubular member, fixedly mounted non-rotatable wedges on said support at opposite sides of said swinging panel and extending into said tubular member to support the same, non-rotatable, longitudinally movable wedges coacting with said fixedly mounted wedges and also positioned in said tubular member, tension rods secured to said movable wedges and extending inwardly toward each other, and manual means for drawing said tension members and movable wedges inwardly to cause said wedges to expand within said tubular member for holding the swinging panel in adjusted position and for swinging said panel.

6. In a wind shield, a frame, a swinging panel including a tubular member, journal bosses secured to said frame and extending into the opposite ends of said tubular member, said journal bosses having wedge surfaces thereon, movable wedge members in said tubular member for coaction with the wedge surfaces on said journal bosses, tension members secured to said movable wedge members, said tension members extending inwardly and each tension member having an abutment surface thereon positioned between the other wedge member and the abutment face of the tension member carried by said other wedge member, an eccentric member pivotally mounted on said tension members and a handle member for actuating said eccentric member and serving as a lever for swinging said panel.

PETER N. LANDINE.